United States Patent

Murakawa et al.

[11] Patent Number: 5,113,819
[45] Date of Patent: May 19, 1992

[54] COOLING SYSTEM FOR A LIQUID COOLED ENGINE

[75] Inventors: Masatake Murakawa; Ryozo Imanishi; Yoji Fujiwara, all of Sakai, Japan

[73] Assignee: Kubota Corporation, Osaka, Japan

[21] Appl. No.: 668,028

[22] Filed: Mar. 12, 1991

[30] Foreign Application Priority Data

Jul. 4, 1990 [JP] Japan .................. 2-178379
Jul. 5, 1990 [JP] Japan .................. 2-179202

[51] Int. Cl.⁵ .................................. F02B 77/00
[52] U.S. Cl. ........................ 123/198 E; 123/41.48; 180/68.1
[58] Field of Search ............ 180/68.1, 68.4, 68.6, 180/69.2, 900; 123/41.11, 41.42, 41.48, 41.49, 41.7, 198 E

[56] References Cited

U.S. PATENT DOCUMENTS

| 4,432,309 | 2/1984 | Hutchison et al. | 123/41.66 |
| 4,766,983 | 8/1988 | Tamba et al. | 181/240 |
| 4,862,981 | 9/1989 | Fujikawa et al. | 180/68.4 |
| 4,891,940 | 1/1990 | Tamba et al. | 180/68.1 |

FOREIGN PATENT DOCUMENTS 62-121125 7/1987 Japan .

Primary Examiner—Noah P. Kamen
Attorney, Agent, or Firm—Webb, Burden, Ziesenheim & Webb

[57] ABSTRACT

A cooling system for a vertical, liquid cooled engine having a first passage for guiding cooling air to a cooling fan disposed above the engine, and a second passage for guiding the cooling air drawn by the cooling fan to flow past the engine and to be exhausted forwardly and downwardly of the engine. The first passage includes an air inlet defined rearwardly of the engine, and is defined by part of an engine hood, a vertical bracket plate erected behind the engine, and a partition extending from the engine hood over an upper surface of the engine. Devices accessory to the engine which are vulnerable to the heat are mounted in a space inside the first passage. The second passage is formed by an air guide cover enveloping the engine and cooling fan and defining an opening in a region opposed to the cooling fan. The air guide cover includes a front portion extending downwardly along the cylinder head. The second passage contains a liquid cooler disposed between an upper surface of the cylinder head and the air guide cover, and a muffler in an exhaust region the second passage. The first and second passages are interconnected through the cooling fan, and define a substantially airtight space from air intake end to exhaust end.

11 Claims, 3 Drawing Sheets

COOLING SYSTEM FOR A LIQUID COOLED ENGINE

BACKGROUND OF THE INVENTION

1. Field of the Invention

The present invention relates to a cooling system for a vertical type engine mounted forwardly of a vehicle such as a tractor or a lawn mower, in which a cooling fan disposed upwardly of the engine draws cooling air through an air inlet provided rearwardly of the engine, and the air having flowed through the engine is discharged outwardly of the vehicle from a lower front position of the engine.

2. Description of the Related Art

This type of engine cooling system is disclosed in Japanese Utility Model Publication Kokai No. 1987-121125 and U.S. Pat. No. 4,432,309.

In the above known system, the engine is forcibly cooled only by cooling air flows produced by a cooling fan disposed upwardly of the engine. Where a diesel engine or an ordinary engine having a large displacement volume is mounted on a working vehicle, the known cooling system is inadequate for cooling the engine since the engine radiates a large quantity of heat. The engine tends to become overheated as a result. It is therefore necessary for such an engine to be liquid cooled. This requires a large cooler for cooling the circulating cooling liquid, which has a negative effect in terms of cost as well as space.

SUMMARY OF THE INVENTION

An object of the present invention is to provide an engine cooling system which is compact and yet capable of efficiently cooling an engine having a large displacement volume.

To achieve the above object, the present invention employs a liquid cooled vertical engine and proposes a cooling system comprising a first passage defined between a cooling fan disposed above the engine and an air intake region, and a second passage defined between the cooling fan and an air exhaust region, the second passage including, disposed above a cylinder head, a liquid cooler for the liquid cooled engine.

According to this cooling system, the engine is cooled by the cooling action of a liquid cooling structure of the engine in addition to cooling air flows produced by the cooling fan, which provides an improved cooling performance over the known cooling system. As a result, the cooling performance required of the liquid cooler itself is reduced, and the liquid cooler may be disposed above the cylinder head by utilizing what has been a dead space by reason of the structure of the vertical type engine. It is therefore unnecessary to increase the hood height or modify the engine layout in order to accommodate the liquid cooler. The problem encountered in the prior art does not arise even with employment of a diesel engine or an ordinary engine having a large displacement volume.

In a preferred embodiment of the present invention, the liquid cooler is an oil cooler erected rearwardly inclined in a way to correspond to an inclination of the engine hood. This enables the space to be used with increased efficiency. Moreover, even if dust or the like is entrained by the cooling air to reach the oil cooler, the inclination of the cooler reduces the possibility of the dust adhering to intake surfaces of the oil cooler.

Since a cooling air passage is defined rearwardly of the engine, a relatively large volume may be provided for this passage. This feature provides the advantage that the rearward air passage may accommodate an air cleaner, a fuel tank and other devices that are vulnerable to the heat.

Other objects and features of this invention will be understood from the following description to be read with reference to the accompanying drawings.

DESCRIPTION OF THE PREFERRED EMBODIMENT

Figure 1:
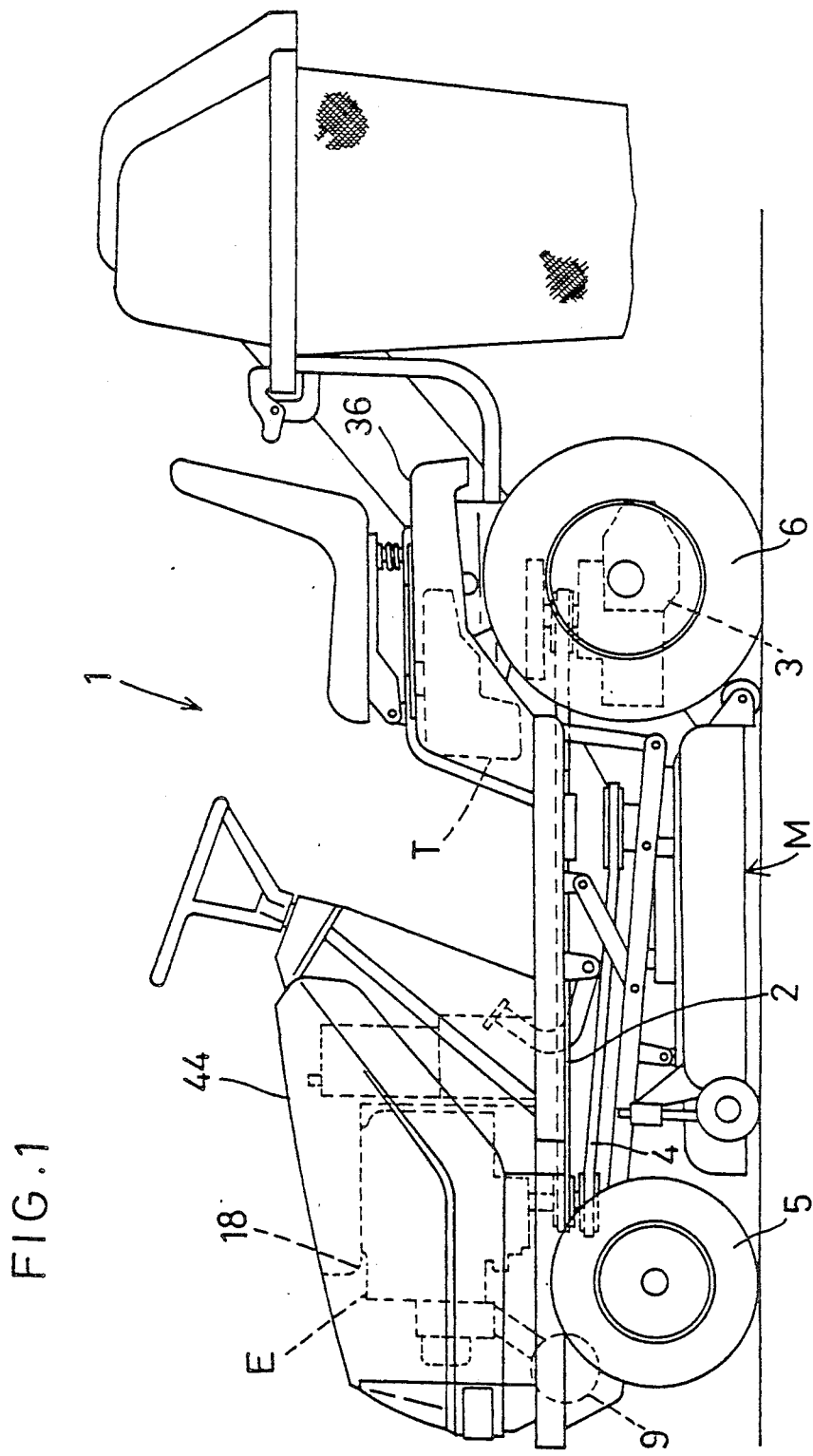
FIG. 1 is a side elevation of a lawn tractor employing a cooling system according to the present invention.

As shown in FIG. 1, a lawn tractor includes a vertical type, liquid cooled engine E mounted in a front position thereof. Oil is used for cooling the engine E in this embodiment. A driver's section 1 is provided in a rearward position of the tractor. Drive of the engine E is transmitted through a first transmission belt 2 to a transmission 3 disposed rearwardly, and through a second transmission belt 4 to a mower unit M suspended from a central position of the tractor. From the transmission 3 the drive is transmitted to rear drive wheels 6. Front wheels 5 are steerable by a steering wheel in the driver's section 1.

Figure 2:
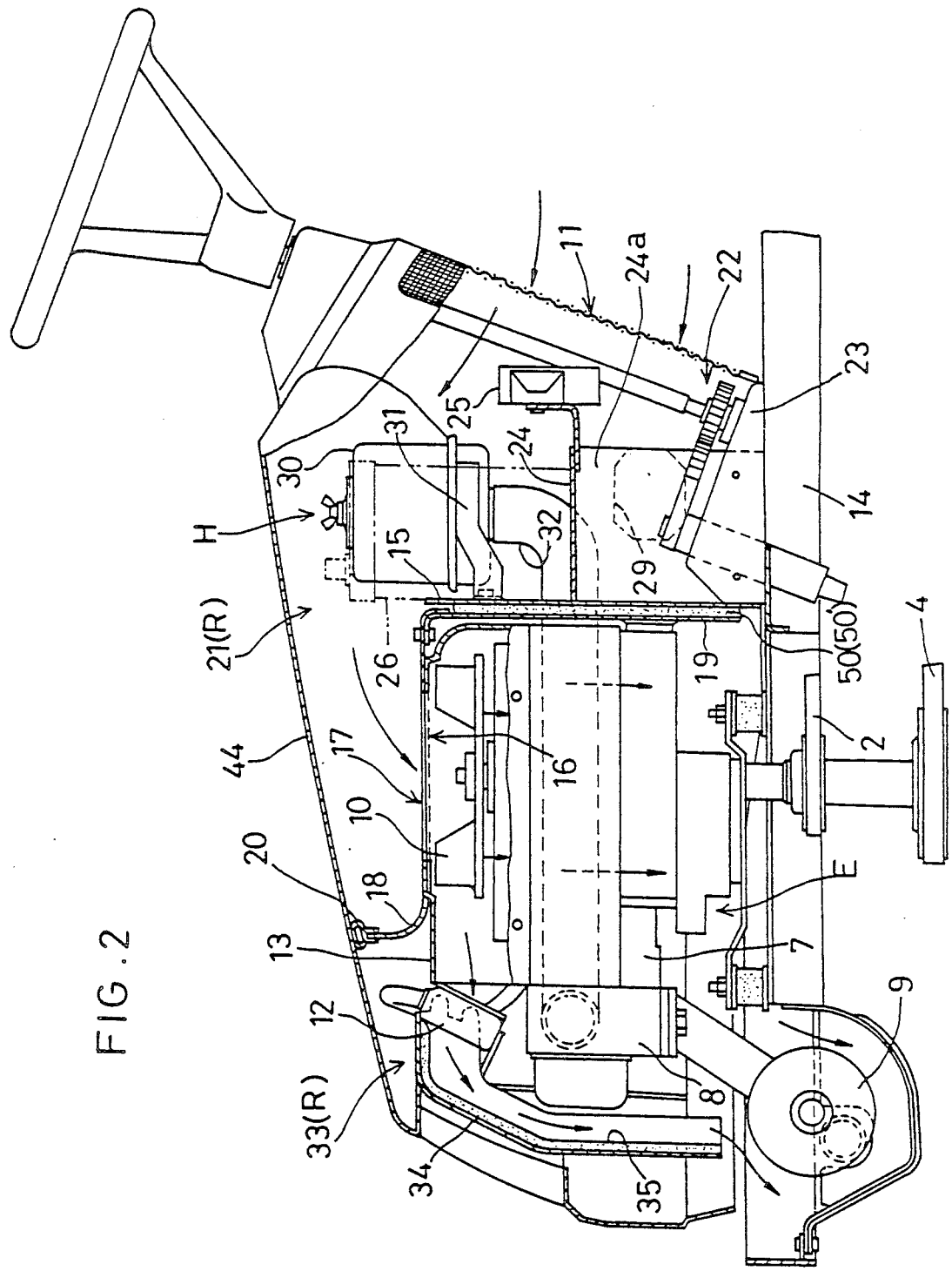
FIG. 2 is a side view of the engine cooling system of the lawn tractor shown in FIG. 1.

As shown in detail in FIG. 2, the engine E is a liquid cooled diesel engine having a cylinder 7 and a cylinder head 8 arranged forwardly and horizontally. A muffler 9 is disposed below the engine E. A cooling fan 10 is disposed upwardly of the engine E, which draws air from an air inlet 11 provided rearwardly of an engine room R, and more particularly in a steering wheel post in this example.

Cooling air produced by the cooling fan 10 flows past the engine body, and is exhausted outwardly of the tractor after cooling the muffler 9 provided in a lower front region of the engine room R.

An oil cooler 12 is mounted in a space surrounded by the cylinder head and a forward portion of an engine hood 44. The oil cooler 12 is inclined rearwardly to roughly follow inclination of the hood 44. An air guide cover 13 covering the engine E and cooling fan 10 is connected at a front end thereof to an upper position of the oil cooler 12, so that the cooling air flows along the guide cover 13 to the oil cooler 12 as well as the cylinder 7 and cylinder head 8. A further air guide cover 34 extends from an opposite upper position of the oil cooler 12 toward the muffler 9. Thus, the two air guide covers 13 and 34, together with a surface of the engine body, define an cooling air passage extending from the cooling fan 10 through the oil cooler 12 to the muffler 9. This construction allows the oil cooler 12 to be supplied with cooling air little heated by the engine. The engine E is supported on frames 14 in a vibration damping manner. There is little space between the engine E and frames 14 and thus a lower region of the engine is substantially tight sealed. Consequently, a large part of the cooling air drawn by the cooling fan 10 is exhausted from the tractor through the muffler 9. The front air guide cover 34 has an inside lined with a sound absorbing material 35 to enhance the sound insulating effect.

Figure 3:
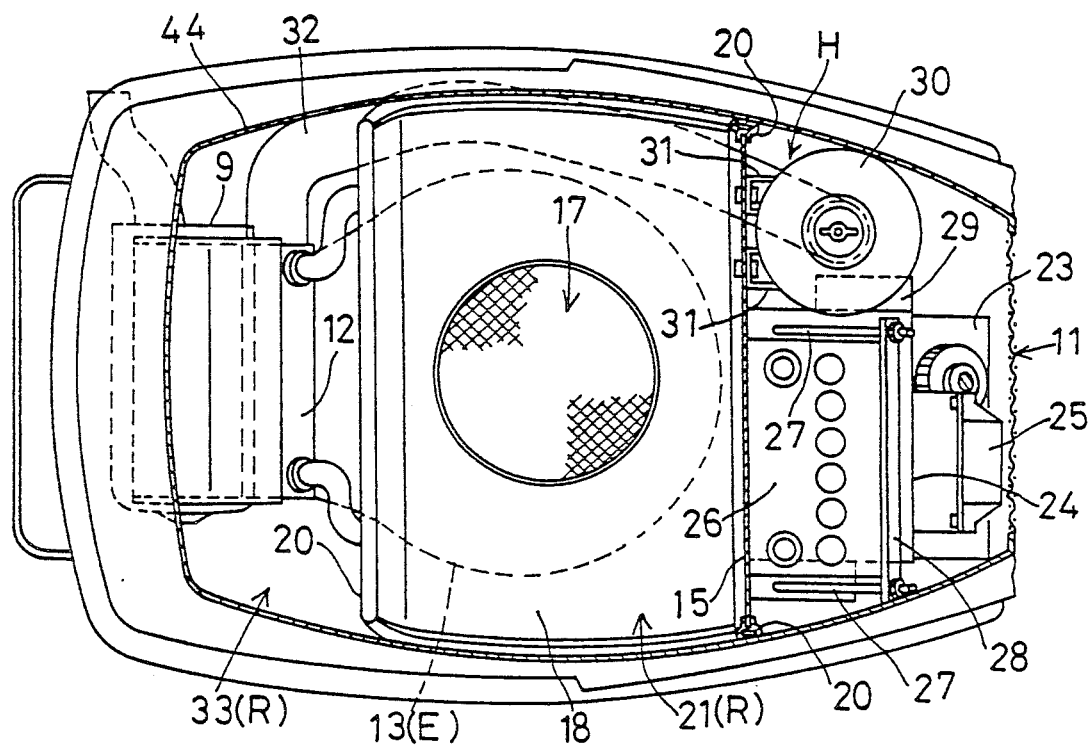
FIG. 3 is a plan view of the engine cooling system.

As seen from FIGS. 2 and 3, a heat insulating plate 15 is erected from a bottom of the engine room R directly behind the engine E. A vertical bracket plate 19 is erected in front of the heat insulating plate 15, and a partition 18 extends horizontally and forwardly from an upper end of the bracket 19. The partition 18 includes an opening 17 opposed to an air intake opening 16 defined in an upper surface of the air guide cover 13. The partition 18 has a forward end thereof curved upward and carrying a sealing element 20 for tight contact with an undersurface of the hood 44.

Thus, the engine room R is divided as tight sealed by the vertical bracket 19 and partition 18 between a front region 33 and a rear region 21. The heat insulating plate 15 is added thereto to form a double wall structure in the rear of the engine. This structure allows a heat insulating material 50 where an increased heat insulating effect is desired, or a sound insulating material 50 where a sound insulating effect is desired, to be inserted between the heat insulating plate 15 and vertical bracket 19.

The rear engine room region 21 includes a cooling air passage defined to be substantially airtight by the vertical bracket 19, partition 18, heat insulating plate 15, part of the hood 44, and a frame of the steering wheel post. Air drawn into this passage enters through the air inlet 11 defined in a wall of the post facing the driver's section 1. This passage includes devices H such as a rectifier 29 and an air cleaner 30 that must be protected from the heat. The cooling air inevitably flows through these devices H to a position above the partition 18 from which the air is taken in by the cooling fan 10.

In the front engine room region 33, an air passage space is defined to be substantially airtight by the vertical bracket 19, air guide covers 13 and 34, lateral faces of the hood 44 and, though not depicted, side walls extending upwardly from the frames 14, i.e. front wheel fenders. As noted hereinbefore, the engine body and oil cooler 12 are mounted in this space, with the muffler 9 mounted in an exhaust region thereof. An efficient cooling system is realized by dividing the engine room into the two, front and rear cooling air passage spaces which communicate with each other through the opening defined adjacent the cooling fan 10.

Figure 4:
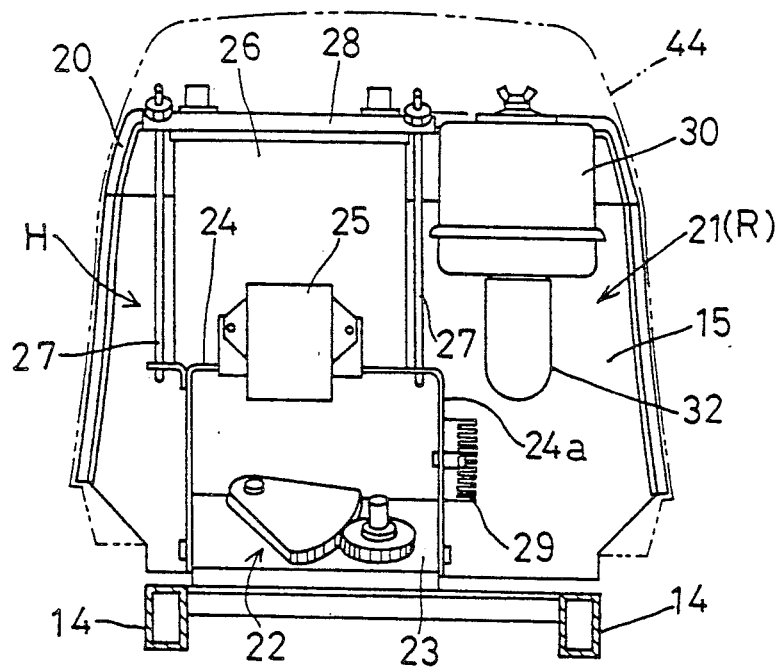
FIG. 4 is a view of a rear portion of an engine as seen from a driver's section of the tractor.

As shown in FIG. 4, a steering control mechanism 22 is disposed in a base region of the steering wheel post. The control mechanism 22 has a support 23 which is enclosed in a downwardly opening frame 24 bolted to the heat insulating plate 15. A relay box 25 is bolted to a bracket extending rearwardly from an upper surface of the frame 24 and bent upwardly.

A battery 26 is mounted on the frame 24, and is pressed and fixed to the heat insulating plate 15 by means of rods 27 and an L-shaped frame 28. The rectifier 29 is bolted to a righthand leg 24a of the frame 24.

The air cleaner 30 is supported by a bracket 31 bolted to the heat insulating plate 15 to the right of the battery 26. An intake pipe 32 extends through the vertical bracket 19 and heat insulating plate 15 to the front engine room region 33. A fuel tank T is mounted below a rear fender 36 in this embodiment, but may be mounted, along with the various devices H accessory to the engine, in the cooling air passage defined in the rear engine room region 21 isolated from the heat of the engine.

A sponge or other sound absorbing material may be inserted between the vertical bracket plate 19 and heat insulating plate 15 with a view to enhanced noise suppression.

A similar advantage will be secured by inserting a sound absorbing material between the vertical bracket plate 19 and air guide cover 13.

What is claimed is:

1. In a vehicle having a liquid cooled engine, a cooling system therefor, and a hood extending over the engine, said engine being formed as a vertical engine with a cylinder head disposed forwardly of the vehicle, an improved cooling system comprising;
   a cooling fan disposed above said engine,
   first passage means for guiding cooling air to said cooling fan,
   second passage means for guiding the cooling air drawn by said cooling fan to flow past the engine and to be exhausted forwardly and downwardly of the engine, said second passage means including an air guide cover enveloping said engine and said cooling fan and defining an opening in a region opposed to said cooling fan, and
   a liquid cooler for cooling a liquid circulating through said engine disposed between an upper surface of said cylinder head and said air guide cover.

2. A vehicle as claimed in claim 1, wherein said liquid is oil, and said liquid cooler is an oil cooler.

3. A vehicle as claimed in claim 2, wherein said oil cooler is inclined rearwardly in a way to roughly follow an inclination of said hood.

4. A vehicle as claimed in claim 1, wherein said first passage means includes an air inlet defined rearwardly of the engine, a vertical bracket plate disposed behind said engine for guiding incoming air toward said hood, and a partition bridging a lower surface of said hood and said air guide cover to guide air directed to a region under said hood to said cooling fan.

5. A vehicle as claimed in claim 4, further comprising a heat insulating plate erected adjacent said vertical bracket plate to block heat radiated rearwardly from the engine.

6. A vehicle as claimed in claim 5, further comprising a heat insulating material interposed between said vertical bracket plate and said heat insulating plate.

7. A vehicle as claimed in claim 5, further comprising a sound absorbing material interposed between said vertical bracket plate and said heat insulating plate.

8. A vehicle as claimed in claim 1, wherein said second passage means includes an air exhaust region containing a muffler of said engine.

9. A vehicle as claimed in claim 1, wherein said air guide cover includes a sound absorbing material lining at least a region thereof opposed to said cylinder head.

10. In a vehicle having a liquid cooled engine, a cooling system therefor, and a hood extending over the engine, said engine being formed as a vertical engine with a cylinder head disposed forwardly of the vehicle, an improved cooling system comprising;
    a cooling fan disposed above said engine,
    first passage means for guiding cooling air to said cooling fan, said first passage means including an air inlet defined rearwardly of the engine, a vertical bracket plate disposed behind said engine for guiding incoming air toward said hood, and a partition bridging a lower surface of said hood and said air guide cover to guide air directed to a region under said hood to said cooling fan.

second passage means for guiding the cooling air drawn by said cooling fan to flow past the engine and to be exhausted forwardly and downwardly of the engine, said second passage means including an air guide cover enveloping said engine and said cooling fan and defining an opening in a region opposed to said cooling fan for connection to said first passage means, said air guide cover and said engine defining a substantially airtight duct space, said air guide cover having a front portion extending downwardly along said cylinder head and defining an exhaust opening at an free end thereof.

a muffler mounted in a region of said exhaust opening, and a liquid cooler for cooling a liquid circulating through said engine disposed between an upper surface of said cylinder head and said air guide cover.

11. A vehicle as claimed in claim 10. wherein said liquid is oil, and said liquid cooler is an oil cooler.

* * * * *